United States Patent [19]
Seifried

[11] 4,116,222
[45] Sep. 26, 1978

[54] PROCESS AND APPARATUS FOR COLLECTING SOLAR ENERGY

[75] Inventor: Walter Seifried, Wiesbaden, Fed. Rep. of Germany

[73] Assignee: Hoechst Aktiengesellschaft, Frankfurt am Main, Fed. Rep. of Germany

[21] Appl. No.: 759,009

[22] Filed: Jan. 13, 1977

[30] Foreign Application Priority Data

Jan. 14, 1976 [DE] Fed. Rep. of Germany ....... 2601170

[51] Int. Cl.² .............................................. F24J 3/02
[52] U.S. Cl. .................................... 126/271; 126/270; 165/168
[58] Field of Search ....................... 126/270, 271, 400; 237/1 A; 165/168, 170; 60/641

[56] References Cited

U.S. PATENT DOCUMENTS

| | | | |
|---|---|---|---|
| 3,107,052 | 10/1963 | Garrison | 126/271 |
| 3,250,269 | 5/1966 | Sherock | 126/271 |
| 3,903,665 | 9/1975 | Harrison | 126/271 |
| 3,908,632 | 9/1975 | Poulsen | 126/271 |
| 3,939,819 | 2/1976 | Minardi | 126/271 |
| 3,981,293 | 9/1976 | Gillery | 126/271 |

FOREIGN PATENT DOCUMENTS

| | | | |
|---|---|---|---|
| 2,461,973 | 7/1975 | Fed. Rep. of Germany | 126/271 |
| 686,641 | 3/1965 | Italy | 126/271 |

*Primary Examiner*—Kenneth W. Sprague
*Assistant Examiner*—James C. Yeung
*Attorney, Agent, or Firm*—Richard L. Schwaab

[57] ABSTRACT

A process and apparatus for collecting solar energy involving exposing a mixture of a fluid carrier and heat absorbing particles to the rays of the sun in a container having a transparent cover facing the rays of the sun, and circulating the mixture to a thermal accumulator or sink. The fluid may be a liquid or gas, or a mixture of liquid and gas; and the particles preferably have a specific gravity different from that of the carrier so they naturally separate if circulation of the mixture stops. The container is dimensioned so that, upon separation of the particles, they no longer are exposed through the transparent surface of the container. Mixture flow control means are provided within the container.

22 Claims, 4 Drawing Figures

PROCESS AND APPARATUS FOR COLLECTING SOLAR ENERGY

BACKGROUND OF THE INVENTION

The present invention relates to a process for converting solar energy into useful heat which may serve, e.g., for heating air or water; further, the invention relates to an apparatus for performing this process.

Apparatuses, i.e., the so-called solar collectors, have already been proposed which substantially consist of a heat-conductive and radiation-absorbing flat-shaped body (absorber) comprising a surface which faces the source of radiation (absorption surface) and which is blackened in order to achieve maximum absorption of the incident radiation energy. On the other hand, the absorption surface is covered with glass plates in order to reduce heat losses caused by reflection of thermal energy from the absorption surface.

At the back of the absorber, the energy absorbed by the absorber normally is transferred to a suitable medium (heat carrier) and conducted away. The heat carrier is conveyed to the back of the absorber and drawn off from it in a cycle. Circulation of the heat carrier usually is effected by means of a system of tubes and appropriate pumps. These devices involve the risk that in the event of a fault in the circulating system, for example in the case of a pump breakdown or loss of heat carrier by leakage or pipe burst, the absorber may be overheated and completely destroyed. In principle, it is possible to take the necessary precautionary measures, but such measures require expensive technical equipment and are very costly.

The transfer of heat from the absorber to the heat carrier poses a further problem in known solar collectors. Since the contacting surface between these two components must be as large as possible, a technically expensive system is required. Further, in the case of a heat carrier extending over a large area, the question of good thermal insulation presents difficulties.

SUMMARY OF THE INVENTION

Thus, it is the object of the present invention to provide a process and an apparatus by means of which the problems just mentioned may be solved in a technically inexpensive manner. In addition to an improved operational safety, combined with a less expensive construction, the new apparatus must have a high efficiency, i.e., a high absorption of incident radiation energy and a low emittance of thermal energy.

According to the present invention, this object is achieved by a process for converting solar energy into useful heat. The process is characterized in that solar rays are caused to act upon a mixture of heat carrier and absorber particles and that the energy absorbed by said mixture is then transferred to a unit which consumes and/or stores this energy. Preferably, the inventive process is performed in such a manner that the heat carrier, which comprises at least one liquid and/or gas, and the absorber particles suspended therein are conducted over a surface facing the sun rays, that the heated mixture is then conveyed to a heat accumulator, and that, after release of its energy, the mixture is again conducted to the surface facing the sun rays.

The present invention further provides a solar collector by means of which the inventive process may be carried out.

The solar collector according to the present invention is characterized in that it is composed of at least one container which contains a mixture of at least one fluid heat carrier and absorber particles, that the surface of the container which faces the sun is transparent and is so dimensioned that, when the flow is interrupted and at least part of the absorber particles separate from the heat carrier and sediment, these absorber particles are no longer exposed to the sun rays penetrating the transparent wall of the container, and that the container is connected to a unit to which the energy absorbed by the mixture of heat carrier and absorber particles is transferred.

The absorber particles mixed with the heat carrier consist of a heat-conductive material which absorbs a high percentage of the sun rays, especially in the wave length range between 0.2 and 1.5 $\mu$. In the simplest case, the absorber particles consist of a black pigment, e.g., carbon black. Further, absorber particles consisting of nickel zinc sulfide or of a material which is already being used in the superblack layers of known solar collectors, may advantageously be used.

The heat carrier consists of a liquid or a gas or of a gas/liquid mixture. It should have a high absorption, especially within the wave length range from 3 to 15 $\mu$; preferably, water is used as the heat carrier. If a gas is used as the heat carrier, air is preferred; but other gases, for example inert gases, may also be employed.

On the side facing the sun, the container containing the mixture of heat carrier and absorber particles is transparent, i.e., this wall of the container is permeable to the sun rays.

Preferably, the transparent portion of the container is coated with an antireflection coating in order to avoid losses due to reflection; most advantageously, the wall of the container carries on the surface facing the heat carrier a transparent infrared mirror, for example a thin indium oxide layer.

In order to avoid thermal losses caused by radiation of heat from the transparent wall of the container, this part of the container may be provided with a suitable cover which is highly permeable within the wave length range from 0.2 to 1.5 $\mu$ and has a high reflection within the range from 3 to 15 $\mu$. A suitable cover may consist, for example, of a glass plate.

The energy absorbed by the absorber particles and passed on to the heat carrier is transferred by the heat carrier onto one or more units which consume and/or store this energy.

The transfer of energy from the heat carrier may take place inside and/or outside the container, but preferably outside, the mixture of heat carrier and absorber particles being removed from the container through at least one outlet opening and re-introduced into the container, after release of the energy, through at least one inlet opening. The flow caused by the circulation of the mixture, which may be maintained by a pump, for example, ensures that the heat carrier and the absorber particles are constantly mixed. Upon interruption of the flow, for example when the pump is switched off or stops functioning due to a defect, the heat carrier separates from the absorber particles and the component having a higher density, normally the absorber particles, sediment.

The transparent portion of the container is so dimensioned that the sun rays passing through it do not strike the separated absorber particles.

Consequently, this embodiment of the apparatus according to the present invention can not function if the absorber particles remain dispersed in the liquid heat carrier during interruption of the flow, for example when both components have the same density. This problem is solved by using, as the heat carrier, a mixture of a gas and a liquid which separates within a relatively short time into a liquid phase and a gaseous phase when the flow is interrupted. In this case, the container should be so constructed that, in the absence of flow, the liquid level can drop to such an extent that the liquid with the absorber particles dispersed therein is outside the range of influence of the sun rays.

In a preferred embodiment of the invention, the interior of the container — with the exception of the transparent portion — is provided with reflecting walls, preferably a mirror layer, especially an aluminum layer.

In this manner, the incident sun light is reflected by the inner walls of the container and thrown back through the transparent portion of the container when the flow is interrupted and the level of the liquid heat carrier is down. In this manner, over-heating of the interior walls of the container is avoided.

DETAILED DESCRIPTION OF THE INVENTION

DETAILED DESCRIPTION

Figure 1:
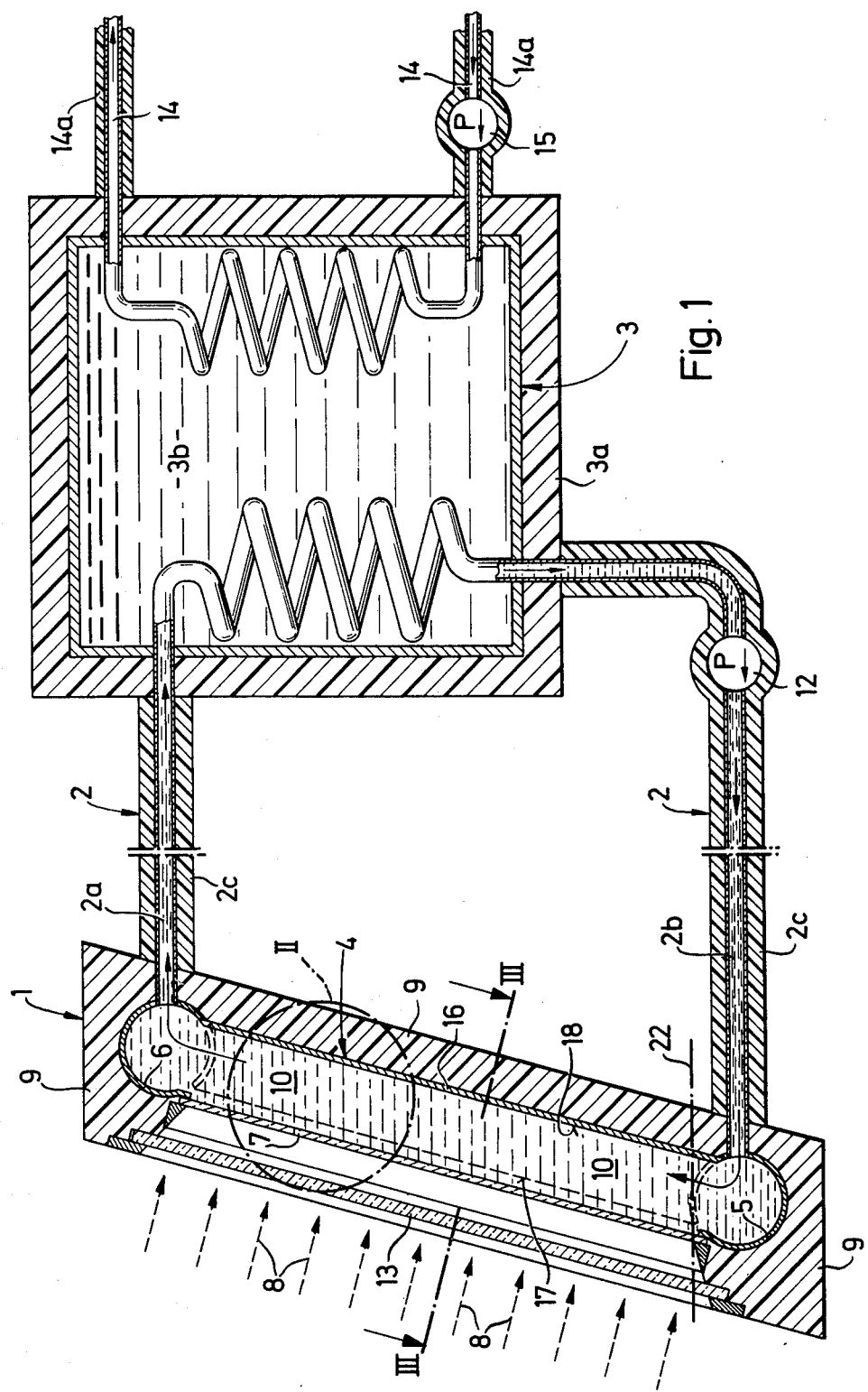
FIG. 1 is a diagramatic side elevation view of the solar energy converter system of the present invention, looking along line I—I in FIG. 3.

With reference to FIG. 1, the preferred embodiment of solar energy converter constructed in accordance with the present invention includes a solar collector 1 connected through a thermally insulated pipe 2 to a thermally insulated heat accumulator or thermal sink 3. The solar collector 1 comprises a container 4 with a transverse feed pipe 5, a drain pipe 6, and a transparent wall 7 having a bottom edge lying above the bottom of container 4 provided with a transparent infrared mirror 21 (see FIG. 2) through which the sun rays 8 may penetrate. With the exception of the wall 7, the container 4 is surrounded on all sides by thermal insulation 9.

The liquid heat carrier 10 contains heat absorber particles 11 suspended therein. The mixture flows in an almost vertical direction through the container 4 and then through the drain pipe 6 and the pipe 2a with the insulating casing 2c into the heat accumulator 3 which is also surrounded by thermal insulation 3a. Here the heat carrier 10 releases its heat to the storage medium 3b and then flows through the pipe 2b, also surrounded by an insulating casing 2c, and the feed pipe 5 back into the container 4, the circulation being maintained by a pump 12. Alternatively, it is also possible for the heat carrier and the absorber particles to flow in the opposite direction. The container 4 is covered by a transparent glass plate 13.

If the pump 12 stops operating, and the motion of the mixture ceases, the absorber particles present in the container 4 sediment and drop down into the opening of the feed pipe 5 at the bottom of the container 4, assuming that the particles have a specific gravity greater than that of the carrier 10. When so sedimented, the particles are not exposed to the sun rays 8, since they lie below the bottom edge of the transparent wall 7 of the container 4.

Figure 2:
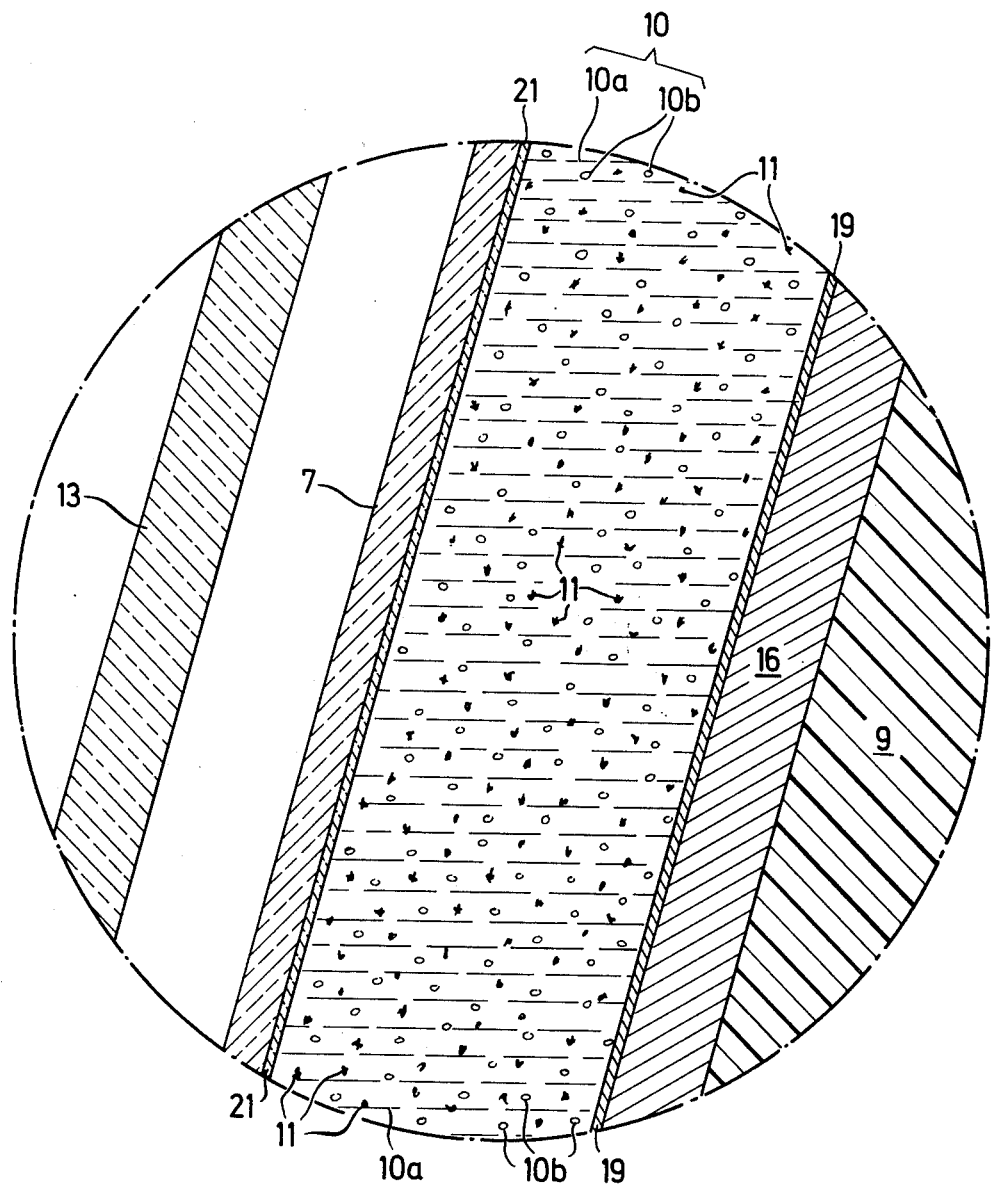
FIG. 2 is an enlarged detailed view of the area bounded by line II in FIG. 1.

A liquid and gaseous mixture may be used as the fluid heat carrier 10, the carrier comprising, as in FIG. 2, a liquid 10a and a gas 10b. Normally, the liquid level drops below the line 22 in the absence of flow of the mixture, whereas the gas phase fills the remainder of the space within the container 4.

The thermal energy is removed from the heat accumulator 3 through the pipe 14, which is also covered by a thermal insulation 14a and is in communication with a pump 15.

Figure 3:
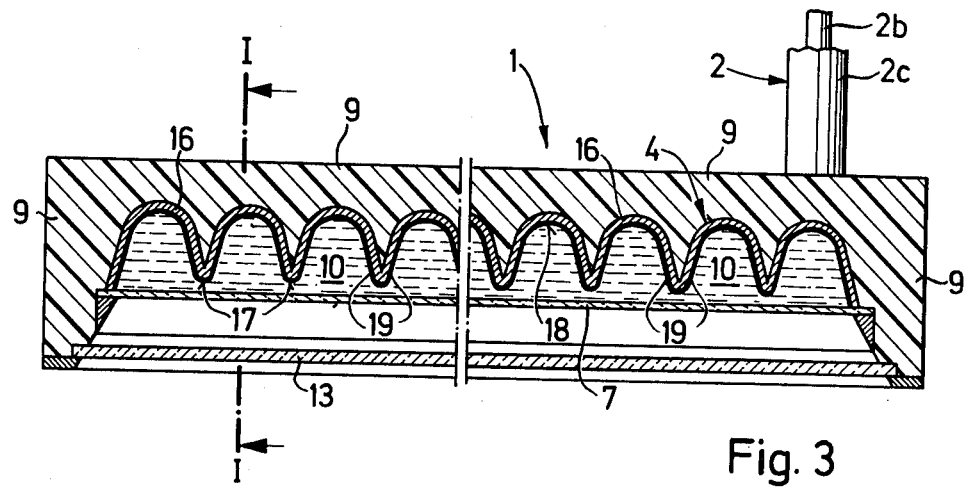
FIG. 3 is a sectional view taken along line III—III of FIG. 1.

As seen in FIG. 3, the wall 16 of the container 14 is provided with elevations 17 and depressions 18 which serve as flow-regulating installations. The wall 16 of the container is provided with a reflection coating 19.

Figure 4:
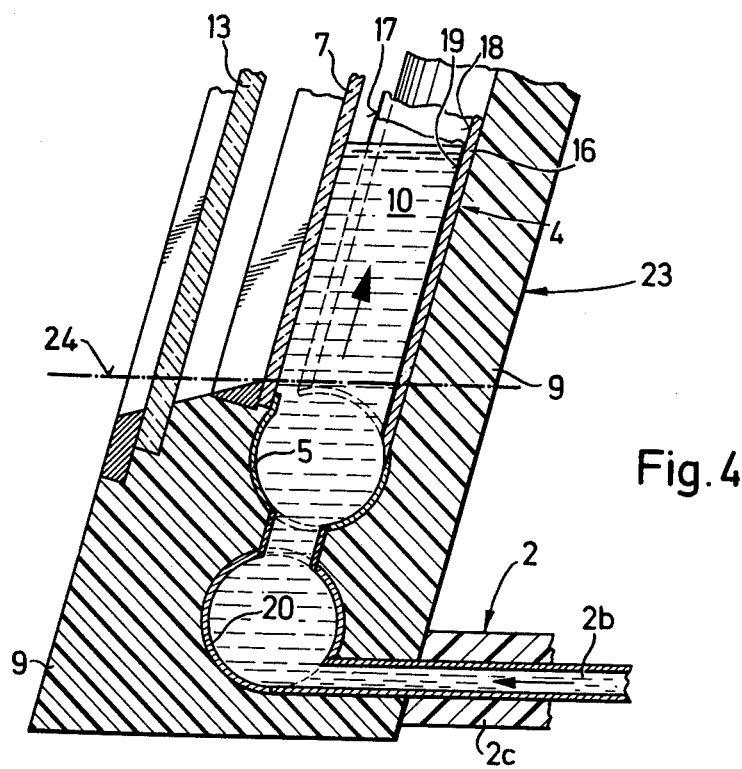
FIG. 4 is a detailed elevational view of an alternate embodiment of the invention.

The FIG. 4 shows part of another modification of a solar collector, with a diagrammatically shown storage tank 20. Such a tank is provided for the event that, in case of an interruption of the flow, the feed pipe 5 is not wide enough to receive the sedimenting absorber particles, or, if a liquid/gaseous heat carrier is used, to receive the liquid dissociating from the gas. If the flow is interrupted, the level of heat carrier 10 drops below the line 24.

The portions of the apparatus through which the heat carrier flows, including the storage tank, are so dimensioned that a turbulent flow is guaranteed.

Other than in the embodiments shown in the FIGURES, the mixture of heat carrier and absorber particles may also be conveyed through the container in an approximately horizontal direction. In this case, however, appropriate constructional changes would be necessary.

By the process according to the present invention and the above described apparatus for its performance, optimum utilization of the radiant energy emitted by the sun becomes possible. The apparatus according to the present invention is distinguished from known solar collectors by a high degree of operational safety and an inexpensive construction.

The foregoing description of preferred embodiments is not intended to limit the invention beyond what is recited in the claims appended hereto.

What is claimed is:

1. An improved process for converting solar energy into usable heat comprising passing a fluid mixture of a heat carrier and heat absorber particles suspended therein to a heating zone for exposure to solar radiation, passing said heated mixture to a heat sink and recovering heat therefrom, and recirculating the mixture to said heating zone through a non-heated zone disposed below said heating zone, whereby damage to the heating zone due to overheating of the mixture during circulation system breakdowns is prevented, wherein the improvement comprises:

a. selecting said heat absorber particles to have a specific gravity such that said particles separate from said mixture when said mixture is not in motion; and b. feeding and passing said mixture through said non-heated zone and said heating zone with a vertical component of flow such that upon termination of mixture movement, said heat absorber particles will separate from said mixture into said non-heated zone out of contact with said solar radiation.

2. The process of claim 1, wherein said heat carrier is a liquid and said absorber particles are black pigment.

3. The process of claim 1, wherein said heat carrier is a gas and said absorber particles are liquid droplets.

4. An apparatus for converting solar energy into usable heat energy, comprising:
   a. a mixture of at least one fluid heat carrier and a quantity of heat absorber particles, said heat absorber particles having a specific gravity such that said particles separate from said mixture when said mixture is not in motion;
   b. at least one solar collector for exposing said mixture to solar radiation, said collector comprising a closed container having a transparent front wall, a back wall mounted in spaced relation with said transparent front wall such that a relatively vertical mixture flow passage is defined therebetween, top and side walls for enclosing said flow passage, and compartment means disposed below said transparent front wall and vertically communicating with said flow passage for storing said heat transfer particles out of contact with said solar radiation; and
   c. means for circulating said mixture through said solar collector.

5. The apparatus of claim 4, further comprising a heat sink fluidly connected to said solar collector for removing heat from said mixture.

6. The apparatus of claim 5, wherein the top, side, and back walls of said solar collector are formed with elevations and depressions thereon for controlling the flow of said mixture.

7. The apparatus of claim 6, wherein said compartment means comprises a feed receptacle disposed below the lower edge of said transparent front wall transversely to said flow passage.

8. The apparatus of claim 6, wherein said heat absorber particles comprise particles of heat-conductive material which absorb solar radiation within the wave length range of between 0.2 and 1.5 $\mu$.

9. The apparatus of claim 8, wherein said particles of heat-conductive material comprise carbon black particles.

10. The apparatus of claim 6, wherein said heat carrier absorbs solar energy within the wave length range of from 3 to 15 $\mu$.

11. The apparatus of claim 10, wherein said heat carrier is a liquid.

12. The apparatus of claim 11, wherein said liquid is water.

13. The apparatus of claim 10, wherein said heat carrier comprises at least one liquid and at least one gas.

14. The apparatus of claim 13, wherein said liquid is water and said gas is air.

15. The apparatus of claim 13, wherein the size of said collector compartment means and the proportion of liquid to gas is such that, upon cessation of circulation, said liquid separates from said gas and occupies a position within said compartment means below the transparent front wall of said collector.

16. The apparatus of claim 6, wherein said solar collector further comprises an anti-reflective coating of a transparent infrared mirror on said transparent front wall on the side adjacent to said flow-passage.

17. The apparatus of claim 16, wherein said infrared mirror comprises a layer of indium oxide.

18. The apparatus of claim 6, wherein said solar collector further comprises a reflecting mirror layer on the top, side, and back walls thereof on the side adjacent to said flow-passage.

19. The apparatus of claim 18, wherein said reflecting mirror layer comprises a layer of aluminum.

20. The apparatus of claim 5, further comprising a second transparent wall mounted in spaced relation to said transparent front wall on the side opposite from said flow passage.

21. The apparatus of claim 20, wherein said second transparent front wall is substantially permeable to solar radiation of a wave length between about 0.2 and 1.5 $\mu$, and highly reflective to solar radiation of a wave length between about 3 and 15 $\mu$.

22. The apparatus of claim 20, wherein said heat carrier is a mixture of a liquid and a gas, and the proportion of liquid to gas and the size of said solar collector compartment means is such that, upon cessation of circulation, said liquid separates from said gas and occupies a position within said compartment means below the transparent front wall of said collector.

* * * * *